Feb. 4, 1969 M. E. PARTIN ET AL 3,426,325

CHARACTER RECOGNITION APPARATUS

Filed June 16, 1965 Sheet 1 of 2

INVENTORS
MELVIN E. PARTIN
ALLEN H. ETT

BY Fordyce A. Bothwell
ATTORNEY

INVENTORS
MELVIN E. PARTIN
ALLEN H. ETT
BY
Fordyce A. Bothwell
ATTORNEY 3,426,325

CHARACTER RECOGNITION APPARATUS

Melvin E. Partin, Montgomeryville, Pa., and Allen H. Ett, Bethesda, Md., assignors to Philco-Ford Corporation, Philadelphia, Pa., a corporation of Delaware Filed June 16, 1965, Ser. No. 464,281
U.S. Cl. 340—146.3 11 Claims
Int. Cl. G06k 9/08

This invention relates to apparatus of the type which is adapted to read or recognize characters such as typed or printed letters. More particularly, the invention relates to that type of apparatus which utilizes light scanning of a character to be recognized.

A simple form of scanning arrangement for such apparatus is one in which a light image, which may be of elongate form, is caused to scan the entire character to be recognized in a single scanning motion. While such a scanning arrangement is highly desirable because of its simplicity, it suffers from inaccuracy due to insufficiency of information acquired by the scanning.

The copending application of M. E. Partin, Ser. No. 443,814, filed Mar. 30, 1965 and assigned to the assignee of the present application, discloses and claims character recognition apparatus of this type which involves production of plural electrical waveforms representative of a character as viewed panoramically through plural masks having different transparency patterns. Such waveforms can be readily utilized to identify the character, for example by differentiating the waveforms to produce derivative waveforms whose positive and negative excursions may serve to identify the character, as hereinafter described.

As disclosed in said copending application, one way of producing the first-mentioned waveforms is to scan the character to be recognized with an elongate light image and projected reflected images through plural masks having different transparency patterns onto photo-cathode surfaces of plural photomultipliers. The latter then produce electrical waveforms representative of the character as viewed panoramically through the respective masks. By way of example, as described in said copending application, the reflected images may be projected through three masks, one having uniform transparency, another having decreasing transparency from top to bottom of the image, and the third having decreasing transparency from bottom to top of the image. The transparency variation may be assumed to be at a constant rate but it could be at a varying rate such as an exponential variation.

One object of the present invention is to provide improved apparatus of the same general type.

Another object of the invention is to provide an improved arrangement for producing the desired electrical waveforms.

In accordance with this invention, plural elongate light beams are produced which are respectively modified by masks having different transparency patterns as above mentioned. These light beams are projected so as to merge them into a single light image which is caused to scan the character to be recognized. To enable separation of components respectively representing scannings of the character by the individual light beams, the latter are caused to have different frequency characteristics. The light reflected by the scanned character is received by a photomultiplier, to the output of which are connected plural filters for separation of said components. The outputs of the filters are electrical waveforms which are representative of said character as illuminated panoramically through the plural masks.

The invention may be clearly understood from the following detailed description with reference to the accompanying drawings wherein FIG. 1 is a schematic illustration of a scanning arrangement according to the present invention;

Figure 1:
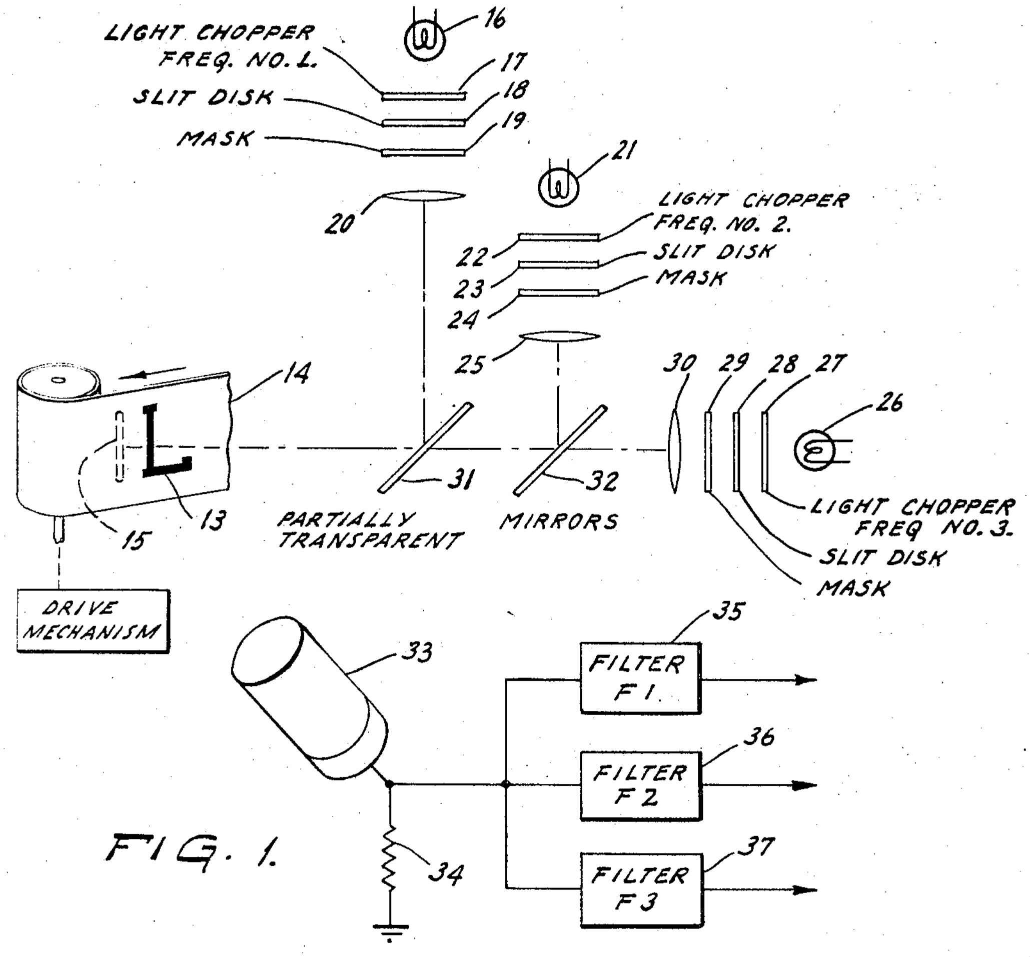

Referring first to FIG. 1, there is shown an arrangement according to the present invention for scanning characters to be recognized. A character 13 to be recognized, here taken to be the capital letter L on a surface 14 such as a movable web, is scanned by an elongate light image 15 having distinct components representative of light transmissions through masks having different transparency patterns. The scanning may be effected by moving the web 14 in the direction of the arrow by conventional means as shown. In the illustrated arrangement for forming the light image 15, light from a first light source 16 is passed through a light chopper 17, a slit disk 18, a mask 19, and a lens 20 to form a first light beam. Similarly light from a second light source 21 is passed through a light chopper 22, a slit disk 23, a mask 24, and a lens 25 to form a second light beam; and light from a third light source 26 is passed through a light chopper 27, a slit disk 28, a mask 29, and a lens 30 to form a third light beam. The light choppers operate at different high frequencies as indicated and they serve to effect distinct modulations of the light beams. The masks 19, 24 and 29 have different transparency patterns. One mask may have a uniform transparency; another mask may have a transparency which decreases from top to bottom in relation to the image of the character; and the third mask may have a transparency which increases from top to bottom in relation to the image of the character. They may be in the form of photographic film exposed and developed so as to have the desired transparency pattern. The light beams thus formed are caused to merge into the composite light image 15 by means of partially transparent mirrors 31 and 32.

Figure 2:
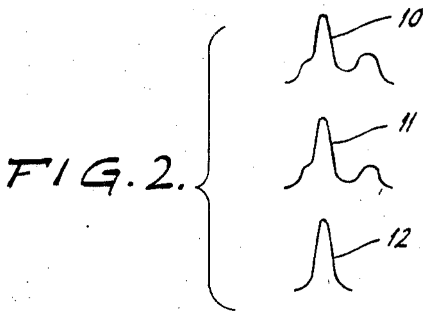
FIG. 2 is an illustration of exemplary waveforms which are produced by the scanning of a particular scanned character.

As the character 13 is scanned, the light reflected therefrom is received by a photomultiplier 33 and is translated into an electrical signal having components corresponding to the aforementioned components of the scanning light image 15. This signal appears across load resistor 34 and is supplied to filters 35, 36 and 37 which separate the signal components according to their modulation frequencies. The filters 35–37 also include an amplitude detector for removing the carrier component of the signal. The outputs of the respective filters are the waveforms 10, 11 and 12 of FIG. 2 which are representative of the capital letter L as viewed panoramically through the masks 19, 24 and 29. Waveform 10 is produced by means of a mask which has maximum transparency at the bottom and decreasing transparency from bottom to top as related to the image of the character. Waveform 11 is produced by means of a mask which has uniform transparency. Waveform 12 is produced by means of a mask which has maximum transparency at the top and decreasing transparency from top to bottom as related to the image of the character. These waveforms may be utilized to determine the character to be recognized, as hereinafter described.

Figure 3:
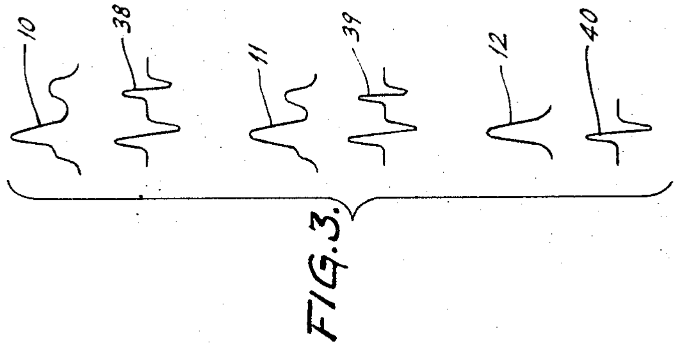
FIG. 3 is an illustration of additional waveforms that may be utilized in the determination of the identity of the scanned character.

As described in the aforementioned copending application, the identity of the character represented by the three waveforms 10, 11 and 12 can be determined by differentiating the waveforms to produce derivative waveforms as shown in FIG. 3 at 38, 39 and 40, and by determining the number of positive and negative excursions of each of the derivative waveforms. In waveforms 38 and 39 there are two positive excursions and two negative excursions, while in waveform 40 there is one positive excursion and one negative excursion. Thus the excursions of the derivative waveforms 38, 39 and 40 can be said to form the code 2, 2, 2, 2, 1, 1, which represents the letter L.

Figure 4:
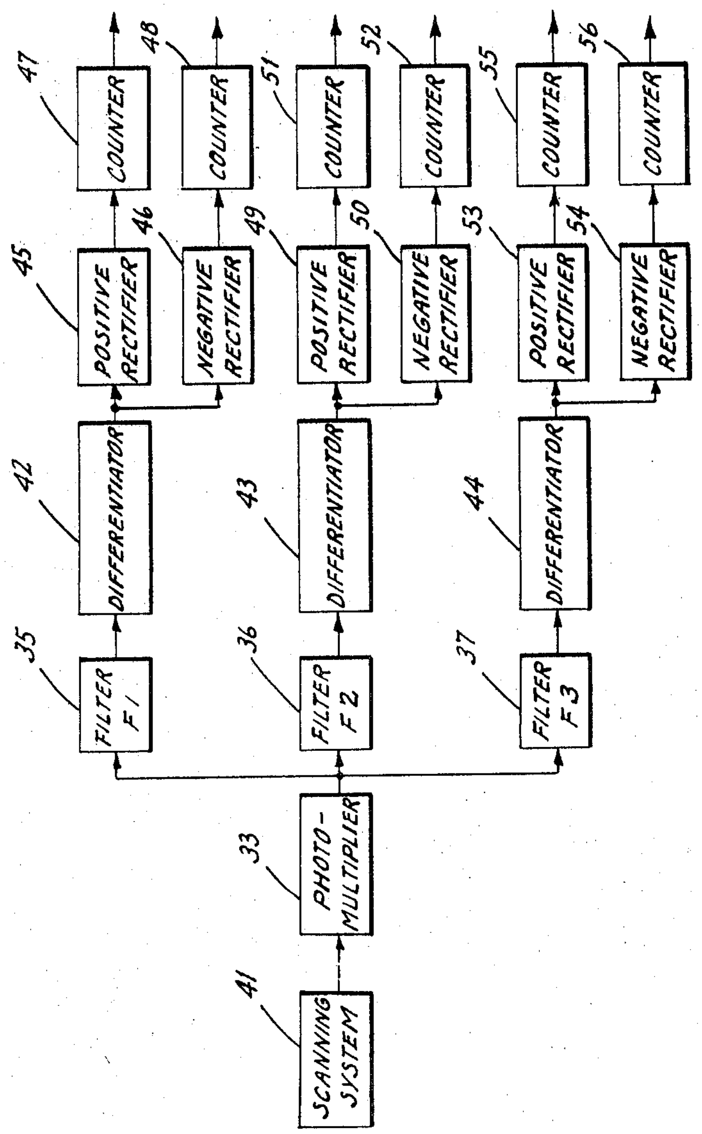
FIG. 4 is a block diagram of a character recognition system according to the present invention.

Referring now to FIG. 4, there is shown a system according to this invention. Block 41 represents the scanning arrangement of FIG. 1. The photomultiplier 33 and filters 35, 36 and 37 are represented by the so-numbered blocks. The outputs of the filters are supplied respectively to differentiators 42, 43 and 44 to produce the derivative waveforms 38, 39 and 40. Waveform 38 is supplied to positive and negative rectifiers 45 and 46 which produce positive and negative pulses that are supplied to counters 47 and 48, said pulses corresponding to the excursions of said waveform. Waveform 39 is supplied to positive and negative rectifiers 49 and 50 which produce positive and negative pulses that are supplied to counters 51 and 52. Waveform 40 is supplied to positive and negative rectifiers 53 and 54 which produce positive and negative pulses that are supplied to counters 55 and 56. At the end of the scan the counters may be sampled to read the code and thus determine the scanned character. The counters are reset to zero prior to the scanning of the next character.

One advantage of the system provided by this invention is that it obviates the need for focusing light from the scanned character onto the photo-cathodes of a plurality of photomultipliers. This increases the light gathered by the photomultiplier. Another advantage is that this system eliminates the need for a plurality of photomultipliers with their attendant problems of alignment and drift.

The invention has been described, by way of example, with reference to recognition or reading of the capital letter L. It is similarly applicable to recognition of other characters such as other letters of the alphabet, numerals, etc.

While the invention has been described with reference to the particular embodiment illustrated, it will be understood that the invention is not limited thereto but contemplates such modifications and further embodiments as may occur to those skilled in the art.

We claim:

1. Character recognition apparatus, comprising means for producing a light image having distinct components representative of light transmissions through masks having different transparency patterns, means for scanning a character with said light image, means for producing from said scanning plural electrical waveforms representative of light reflected by said character as illuminated panoramically through said masks, and means for utilizing said waveforms to determine the identity of said character.

2. Character recognition apparatus, comprising means for producing a light image for scanning of a character to be recognized, said light image having different frequency components representative of light transmissions through masks having different transparency patterns, means for scanning said character with said light image, means for producing from said scanning an electrical signal having components corresponding to said different frequency components, means for separating said signal components, and means for utilizing said separated signal components to determine the identity of said character.

3. Character recognition apparatus according to claim 2, wherein said first means comprises means for projecting distinctly modulated light through masks having different transparency patterns to form distinct light beams, and means for merging said light beams into a single light image.

4. Character recognition apparatus, comprising means for producing plural light beams having different intensity patterns, means for effecting distinct modulations of said beams, means for constituting from said beams a light image having distinct components, means for scanning a character with said light image, means for producing from said scanning an electrical signal having components corresponding to said image components, means for separating said signal components, and means for utilizing said separated signal components to determine the identity of said character.

5. Character recognition apparatus according to claim 4, wherein said beams are of elongate form and have different intensity patterns lengthwise of their elongate form.

6. Character recognition apparatus according to claim 5, wherein the different intensity patterns are imparted to the beams by passing them through masks having different transparency patterns.

7. Character recognition apparatus, comprising means for producing a light image having distinct components representative of light transmissions through masks having different transparency patterns, means for scanning a character with said light image, means for producing from said scanning plural electrical waveforms representative of said character as illuminated panoramically through said masks, means for differentiating said waveforms to produce derivative waveforms, means for rectifying said derivative waveforms, and means for utilizing the outputs of said rectifying means to determine the identity of said character.

8. Character recognition apparatus, comprising means for producing a light image for scanning of a character to be recognized, said light image having distinct components representative of light transmissions through masks having different transparency patterns, means for scanning said character with said light image, means for producing from said scanning an electrical signal having components corresponding to said image components, means for separating said signal components, means for differentiating the separated signal components to produce derivative waveforms, means for rectifying said derivative waveforms, and means for utilizing the outputs of said rectifying means to determine the identity of said character.

9. Character recognition apparatus, comprising means for producing plural light beams having different intensity patterns, means for effecting distinct modulations of said beams, means for constituting from said beams a light image having distinct components, means for scanning a character with said light image, means for producing from said scanning an electrical signal having components corresponding to said image components, means for separating said signal components, means for differentiating the separated signal components to produce derivative waveforms, means for rectifying said derivative waveforms, and means for utilizing the outputs of said rectifying means to determine the identity of said character.

10. Character recognition apparatus, comprising means for producing a light image for scanning of a character to be recognized, said light image having distinct components representative of light transmissions through masks having different transparency patterns, means for scanning said character with said light image, means for producing from said scanning an electrical signal having components corresponding to said image components, means for separating said signal components, means for differentiating the separated signal components to produce derivative waveforms, means for deriving positive and negative pulses corresponding to the positive and negative excursions of said waveforms, and means for counting the positive and negative pulses derived from each of said waveforms, thereby to determine the identity of said character.

11. Character recognition apparatus, comprising means for producing plural light beams having different intensity patterns, means for effecting distinct modulations of said beams, means for constituting from said beams a light image having distinct components, means for scanning a character with said light image, means for producing from said scanning an electrical signal having components corresponding to said image components, means for separating said signal components, means for differentiating the separated signal components to produce derivative waveforms, means for deriving positive and negative pulses corresponding to the positive and negative excursions of said waveforms, and means for counting the positive and negative pulses derived from each of said waveforms thereby to determine the identity of said character.

References Cited

UNITED STATES PATENTS

| | | | |
|---|---|---|---|
| 3,196,393 | 7/1965 | Siegemund | 178—5.4 |
| 3,292,148 | 12/1966 | Giuliano | 340—146.3 |

FOREIGN PATENTS

| | | |
|---|---|---|
| 845,510 | 8/1960 | Netherlands. |
| 897,316 | 5/1962 | England. |

MAYNARD R. WILBUR, *Primary Examiner.*

J. SHERIDAN, *Assistant Examiner.*

U.S. Cl. X.R.

250—233